US007561558B2

(12) United States Patent
Agarossi et al.

(10) Patent No.: US 7,561,558 B2
(45) Date of Patent: Jul. 14, 2009

(54) TRANSMISSION POWER OPTIMIZATION OF OFDM WIRELESS COMMUNICATION SYSTEM

(75) Inventors: Luigi Agarossi, Concorezzo (IT); Luca Giangaspero, Bari (IT); Morena Minto, Mirano (IT); Diego Ragazzi, Piacenza (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 558 days.

(21) Appl. No.: 10/527,005

(22) PCT Filed: Sep. 1, 2003

(86) PCT No.: PCT/IB03/03992

§ 371 (c)(1),
(2), (4) Date: Mar. 7, 2005

(87) PCT Pub. No.: WO2004/025870

PCT Pub. Date: Mar. 25, 2004

(65) Prior Publication Data

US 2006/0128318 A1 Jun. 15, 2006

(30) Foreign Application Priority Data

Sep. 10, 2002 (EP) .................................. 02078749

(51) Int. Cl.
*H04B 7/208* (2006.01)
(52) U.S. Cl. ..................... 370/344; 370/310; 370/343
(58) Field of Classification Search .................. 370/344
See application file for complete search history.

(56) References Cited

U.S. PATENT DOCUMENTS 6,005,893 A * 12/1999 Hyll ........................... 375/260

(Continued)

FOREIGN PATENT DOCUMENTS

EP 0869647 A2 10/1998

JP 2002009841 1/2001
WO 2006013484 A1 2/2006

OTHER PUBLICATIONS

Wind-Flex: A Flexible Radio Interface Architecture for Short_Range High_Speed Wireless Networking, vol. 32, Doc. May 2002 pp. 1-12.

(Continued)

*Primary Examiner*—Lester Kincaid
*Assistant Examiner*—Diego Herrera

(57) ABSTRACT

A method for minimizing processing and transmission power in a flexible and bidirectional OFDM wireless communication system including a MAC layer and a PHY layer, said PHY layer including a supervisor unit controlling in real time the performance of the PHY layer is disclosed. The method comprises feeding a first set of input data as to the QoS requirements at the PHY layer from the MAC layer to the supervisor unit comprising a Target Rate (required information rate), a Target BER (required Bit Error Rate) and a Max Delay (max tolerable delay); feeding a second set of input data including channel power transfer functions $H=(|Hi|2(:$ (index i refers to the ith sub-carrier) from PHY layer to the supervisor unit; processing the first and second set of input data for minimizing processing and transmission power in a wireless communication network system; and outputting N, modulation and coding parameters and transmission power parameters to the PHY layer. The coding parameters and transmission power parameters to the PHY layer include C: Code rate data; B: Block length data; n: data as to the number of decoding iterations; $M=(M_i(:$ data as to a set of codes to specify the generally different constellations adopted for the different sub-channels (e.g. $M_i=0$ means that the ith sub-channel is OFF, different values specify constellation types in the pre-defined available set); and $P=(P_i(:$ data as to a set of the generally different transmission powers adopted for the different sub-channels (e.g. $P_i=0$ means that the ith sub-channel is OFF). The method is performed in a wireless communication system, in particular in a supervisor unit.

17 Claims, 14 Drawing Sheets

U.S. PATENT DOCUMENTS

| | | | | |
|---|---|---|---|---|
| 6,049,837 | A * | 4/2000 | Youngman | 709/250 |
| 6,175,550 | B1 * | 1/2001 | van Nee | 370/206 |
| 6,262,994 | B1 | 7/2001 | Dirschedl et al. | |
| 6,385,462 | B1 | 5/2002 | Baum et al. | |
| 6,498,821 | B2 * | 12/2002 | Jonas et al. | 375/347 |
| 6,850,498 | B2 * | 2/2005 | Heath et al. | 370/328 |
| 7,003,044 | B2 * | 2/2006 | Subramanian et al. | 375/260 |
| 7,120,166 | B2 * | 10/2006 | McFarland et al. | 370/480 |
| 7,190,683 | B2 * | 3/2007 | Giallorenzi et al. | 370/335 |
| 7,453,833 | B2 | 11/2008 | Yi et al. | |
| 2002/0004379 | A1 | 1/2002 | Gruhl et al. | |
| 2002/0044610 | A1 | 4/2002 | Jones | |
| 2002/0080735 | A1 * | 6/2002 | Heath et al. | 370/328 |
| 2002/0136190 | A1 * | 9/2002 | Hata | 370/344 |
| 2002/0181436 | A1 * | 12/2002 | Mueckenheim et al. | 370/349 |
| 2003/0179727 | A1 * | 9/2003 | Soong et al. | 370/328 |
| 2004/0252632 | A1 * | 12/2004 | Bourdoux et al. | 370/210 |
| 2005/0047517 | A1 * | 3/2005 | Georgios et al. | 375/267 |
| 2005/0117543 | A1 * | 6/2005 | Heath et al. | 370/329 |
| 2006/0094363 | A1 * | 5/2006 | Kang et al. | 455/63.1 |
| 2006/0140249 | A1 * | 6/2006 | Kohno | 375/130 |

OTHER PUBLICATIONS

Hermann Rohling et al, Adaptive Coding and Modulation in an OFDM-TDMA Communication Systems, VTC, May 1998, pp. 773-776.

Morena Minto, et al; Minimum Transmission Power, Algorithm for OFDM-Based Flexible Systems, Sep. 2002, pp. 1-4.

* cited by examiner

> For every useful (M,C) derive received power to
> obtain for each single carrier transmission the required
> BER in a AWGN channel:
>
> $$P_{r,awgn}^{(k,i)} = P_n \cdot snr^{(k,i)} \cdot N^{(k,i)}$$

> For every useful (M,C) calulate the power to be
> received in the worst among the necessary SCs:
>
> $$P_r^{(k,i)} = (1/a_N^{(k,i)}) \cdot P_{r,awgn}^{(k,i)}$$

> For every useful (M,C) calulate the total received power
> for all $N^{(k,i)}$ SCs:
>
> $$P_{r,tot}^{(k,i)} = P_r^{(k,i)} \cdot N^{(k,i)}$$

> Find the lowest power (M,C), (M,C) min_pow:
>
> $$P_{r,min\_pow} = \min_{(k,i)} \left\{ P_{r;tot}^{(k,i)} \right\}$$

FIG. 5A-2

TRANSMISSION POWER OPTIMIZATION OF OFDM WIRELESS COMMUNICATION SYSTEM

The invention relates to an OFDM Wireless Communication Method and System.

All recent wireless technology developments, although caused by different market requirements and applications (e.g., WLANs for portable connectivity in office IT enterprises, WPANs for cable replacement and personal sphere interconnectivity, etc.), have been characterized by a common quest for higher capacity density and link speed, on one hand, and greater reliability and flexibility in the presence of varying channel conditions and/or traffic loading and QoS system requirements, on the other.

For this purpose, an architecture is necessary that realizes a joint adaptive strategy across lower layers, aiming at the dynamic optimization of system performance in scenarios entailing time-varying service requirements and channel conditions. To sustain such features, all basic radio interface schemes (i.e. modulation, coding, access scheme, etc.) have to be designed so as to allow highly granular flexible variations of their parameters, instantiated by adaptive algorithms and reconfigurable sub-systems. Moreover, in order to effect adaptivity at the physical layer, a possible solution is to keep the slot (symbol) and frame length fixed, and to vary the triplet of modulation size, code rate, and transmitted power.

A transceiver architecture of the above kind is shown in FIG. 1. The transceiver comprises, on the transmitter side, a MAC layer 2 which is connected to a supervisor 4 and a turbo encoder 6. The supervisor is connected to the turbo encoder 6 and an OFMD modulator 8 which also receives an output from the turbo encoder 6. The output of the OFDM modulator is fed to an antenna 12 by high power amplifier 10.

At the receiver side, an antenna 14 receives the signal and feeds it to a low-noise amplifier 16. The output of the low-noise amplifier 16 is fed via a channel estimator 18, an OFDM demodulator 20 and a turbo decoder 22 to a MAC layer 24 on the receiver side.

In such an arrangement, a supervisor 4 is needed. The supervisor is the basic processing and control unit of any adaptive and reconfigurable system meant to perform, at run-time, a pre-defined system optimization. The inputs and outputs of the supervisor are both parameters and directives. The task of supervisor is to solve the problem of fitting the QoS (Quality of Service) requirements from the MAC (Medium Access Control) layer, given the current channel conditions (input parameters), with the minimum transmitted power. The output parameters could be the different coding and modulation scheme, the adjusted transmitted power and the subset of the sub-carriers to be excised. The channel (except noise) is considered reciprocal. So the TX (Transmitter) can adjust the transmitter parameters according to measurements done at the RX (Receiver). The values of transmitter parameters currently in use are then communicated to the RX of the other side of the link, and demodulated enabling the actual data demodulation.

At the MAC layer the bit transmission is organized in a Time-Division Multiple Access (TDMA) way. The time axis could be divided into frames which, in turn, could be divided into time slots, characterized by a fixed time duration which entails a fixed frame duration and a variable number of bits carried out, which number depends on the adopted coding/modulation scheme.

It is an object of the invention to provide a method and a system to manage the system flexibly, while for example minimizing processing and/or transmission power, in a flexible and reciprocal OFDM wireless communication system.

To achieve this object, there is provided a method for supervising an OFDM wireless communication system including a MAC layer and a PRY layer, said PHY layer including a supervisor unit, wherein:

a) a first set of input data comprising a Target_Rate and a Target_BER is inputted into the supervisor unit; and b) the first set of input data is processed by the supervisor unit; and c) a code rate C and a set of codes M={$M_i$} for specifying constellations for sub-channels are outputted from the supervisor unit;

According to a preferred embodiment of the method of the invention, for minimizing transmission power in an OFDM wireless communication system including a MAC layer and a PHY layer, said PHY layer including a supervisor unit controlling performance of the PHY layer, the method comprises:

a) processing of first and second sets of input data for minimizing transmission power in a wireless communication network system, which processing comprises:

b) calculating the maximum bit rate achievable by every couple M/C, identified by modulation k and code-rate i, with all sub-channels turned on;

c) eliminating the couples M/C for which the maximum achievable bit rate is less than the requested one;

d) for every couple useful M/C:

d1) calculating the minimum number of sub-channels required to achieve the bit rate B;

d2) deriving, from simulation-based curves, the SNR necessary to obtain the required BER in the AWGN case and use it to derive the SNR required by the worst sub-channel;

e) calculating the total received power for all $N^{(k,i)}$ sub-channels;

f) selecting and outputting an "optimum" couple M/C ((M, C)$_{min\_pow}$) which minimizes $P_r^{(k,i)}$:

$$P_{r,min\_pow} = \min_{(k,i)} \{P_{r,tot}^{(k,i)}\}$$

According to a preferred embodiment of the method of the invention, in case the starting information is the maximum transmit power and the Target_BER, the processing of the first and second set of input data for minimizing transmission power in a wireless communication network system comprises:

a) calculating the maximum received power;

b) calculating the minimum SNR on the weakest sub-channel, for every number j of sub-channels considered and storing the result;

c) for every couple M/C, calculating the number of sub-channels having an SNR above the threshold yielding the BER requested by the MAC sub-layer;

d) calculating the bit rate achievable using $N^{(k,i)}$ sub-channels;

e) finding the M/C (called (M,C)$_{max}$) that yield the maximum bit rate; and f) selecting and outputting an "optimum" couple M/C (called (M,C)$_{max}$).

According to a preferred embodiment of the method of the invention, in case the starting information is the maximum transmit power and the Target_Rate, the processing of the first and second set of input data for minimizing transmission power in a wireless communication network system comprises:
a) calculating the maximum receive power;
b) for every M/C, calculating the number of sub-channels used to achieve the bit rate Target_Rate;
c) selecting the SNR on the worst sub-channel;
d) calculating from the BER-SNR curve the BER corresponding to the worst sub-channel for modulation k and coderate i;
e) finding the M/C (called $(M,C)_{min}$) that yield the minimum value; and
f) selecting and outputting an "optimum" couple M/C (called $(M,C)_{min}$).

According to a preferred embodiment of the method of the invention, for minimizing processing power in an OFDM wireless communication system including a MAC layer and a PHY layer, said PHY layer including a supervisor unit controlling performance of the PHY layer, the method comprises:
a) processing of first and second sets of input data, which processing comprises:
b) comparing Target_Rate and Rate_(N)=C_*log(M_)*N for each available N (from 1 to max_available_N);
c) selecting and accepting the values of N satisfying Target_Rate≦Rate_(N);
d) ordering these values in ascending order to get [$N_{min}$, $N_{max}$];
e) assuming $N_{opt}=N_{min}$; and
f) providing $N_{opt}$ and minimum TX power parameters as output.

According to a preferred embodiment, the method of the invention further comprises, after assuming $N_{opt}=N_{min}$:
checking if the transmission power constraint is satisfied, if so providing $N_{opt}$ and minimum TX power parameters as output, if not
going on to check if another value is available in the set [$N_{min}$, $N_{max}$], if so choosing the next (next_N), set N to next_N and jumping to selecting and accepting the values of N that satisfy Target_Rate≦Rate_(N), if not
setting $N_{opt}=0$ and providing $N_{opt}$ and minimum TX power parameters as output.

According to a preferred embodiment of the method of the invention, the processing of the first and second set of input data for minimizing transmission power in a wireless communication network system comprises:
selecting the best window position among the possible ones:
(max_available N−($N_{opt}$−1)); and
running the adopted TX power minimization algorithm in the selected window.

According to a preferred embodiment, the method of the invention comprises feeding the first set of input data as to the QoS requirements at the PHY layer from the MAC layer to the supervisor unit; feeding a second set of input data including channel power transfer functions H={$|H_i|^2$}: (index i refers to the $i^{th}$ sub-carrier) from PHY layer to the supervisor unit; processing the first and second set of input data for minimizing processing and transmission power in a wireless communication system; outputting N, modulating, coding parameters and transmission power parameters to the PHY layer;

According to a preferred embodiment of the method of the invention, the feeding of the first set of input data as to the QoS requirements at the PHY layer from the MAC layer to the supervisor unit comprises feeding a Max_Delay (max tolerable delay).

According to a preferred embodiment of the method of the invention, the outputting of coding parameters and transmission power parameters to the PHY layer comprises:
N: IFFT/FFT length;
the C: code rate data;
B: Block length data;
n: data of the number of decoding iterations;
the M={$M_i$}: data as to a set of codes to specify the generally different constellations adopted for the different sub-channels (e.g. $M_i=0$ means that the $i^{th}$ sub-channel is OFF, different values specify constellation types in the pre-defined available set); and
P={$P_i$}: data as to a set of the generally different transmission powers adopted for the different sub-channels (e.g. $P_i=0$ means that the $i^{th}$ sub-channel is OFF).

According to a preferred embodiment, the method of the invention comprises outputting actual QoS data to the MAC layer.

According to a preferred embodiment of the method of the invention, outputting actual QoS data to the MAC layer comprises outputting an Actual_Rate (rate actually determined for the current transmission); and an Actual_BER (BER actually determined for the current transmission).

According to a preferred embodiment of the method of the invention the MAC layer requests a feedback specifying a Feedback_mode [0/1] (one bit information to specify if MAC is interested to have a feedback information on the "current" maximum available rate or the minimum available BER), and, furthermore, specifies a Service_mode [0/1] (one bit information to specify if MAC QoS requirements refers to a Rate guaranteed service or to a BER guaranteed service).

According to a preferred embodiment of the method of the invention wherein outputting actual QoS data to the MAC layer additionally comprises, depending on the Feedback_mode request from MAC layer, outputting a MAC_return comprising a Max_available_Rate (maximum available rate for the current channel condition as far as BER and tolerable delay requirements are respected) or a Min_available_BER (minimum available BER for the current channel condition as far as rate and tolerable delay requirements are respected) is provided after the optimization processing.

According to a preferred embodiment of the method of the invention the processing of the first and second set of input data for minimizing processing and transmission power in a wireless communication network system comprises finding N, the M/C couple and the ON sub-channels required to fit the Target_Rate and the Target_BER requirements with the minimum power, given the current channel condition.

According to a preferred embodiment of the method of the invention, in case the channel conditions prevent achieving the required QoS even with the maximum available transmission power, the supervisor algorithm (depending on Service_mode) finds the M/C couple, the number and the position of the ON sub-channels required to get the Maximum Rate compatible with the Target_BER requirement, given the current channel condition and the maximum power allowed by the system specifications, or the Minimum BER compatible with the Target_Rate requirement, given the current channel condition and the maximum power allowed by the system specifications.

To achieve the above object, there is provided an OFDM wireless communication system including a MAC layer and a PHY layer, said PHY layer including a supervisor unit controlling performance of the PHY layer for minimizing processing and transmission power of the wireless communication system, wherein the supervisor unit is configured to perform any of the above methods.

To achieve the above object, there is provided a supervisor unit in an OFDM wireless communication network system including a MAC layer and a PHY layer, said supervisor unit being included in the PHY layer and controlling performance of the PHY layer for minimizing transmission power of the wireless communication system, the supervisor unit is configured to perform any of the above methods.

To achieve the above object, there is provided an interface unit in an OFDM wireless communication system including a MAC layer and a PHY layer, said PHY layer including a supervisor unit controlling performance of the PHY layer for minimizing transmission power of the wireless communication network system, said interface being located between the supervisor unit and the MAC layer, wherein said interface unit is configured to perform any of the above methods.

To achieve the above object, there is provided a computer-readable medium containing a computer-readable program for minimizing processing power in an OFDM wireless communication system including a MAC layer and a PHY layer, said PHY layer including a supervisor unit controlling performance of the PHY layer for minimizing processing and transmission power of the wireless communication system wherein the program when implemented in the supervisor and run in the supervisor unit causes the supervisor to perform any of the above methods.

The invention exploits the flexibility which is introduced in the system implementation in order to be able, at run-time, to reconfigure. and adapt the system itself with the purpose of minimizing the processing and transmission power required to fulfill the QoS, given the current channel condition.

The invention provides in an advantageous way a high-performance, flexible, QoS-aware method for minimizing transmission power in a flexible and reciprocal OFDM wireless communication network system and a flexible and reciprocal OFDM wireless communication network system wherein the transmission parameters are optimized with a reduced processing complexity in order to be able to reconfigure, at run-time, the system itself with the purpose of minimizing the transmission and/or the processing power required to fulfill the QoS, given the current channel condition. In particular, the reduction of the inherent power consumption in the mobile terminals of such a system is advantageous.

These and various other advantages and features of novelty which characterize the present invention are pointed out with particularity in the claims annexed hereto and forming a part hereof. However, for a better understanding of the invention, its advantages and the object obtained from its use, reference should be made to the drawings which form a further part hereof, and to the accompanying descriptive matter in which preferred embodiments of the present invention are illustrated and described.

Figure 1:
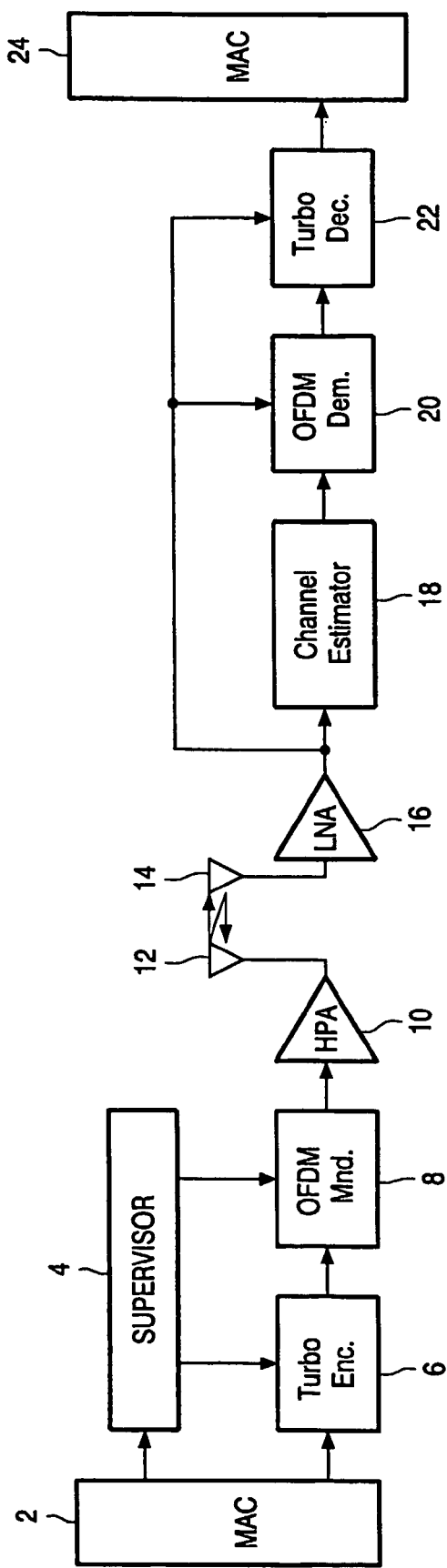
FIG. 1 is a block diagram of a wireless communication system network.
Figure 2:
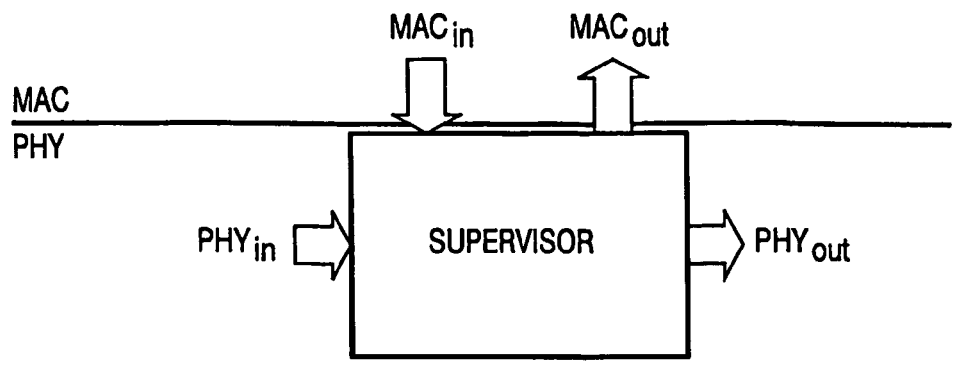
FIG. 2 is a schematic representation of an embodiment of a supervisor unit to be used in a system of FIG. 1.
Figure 3:
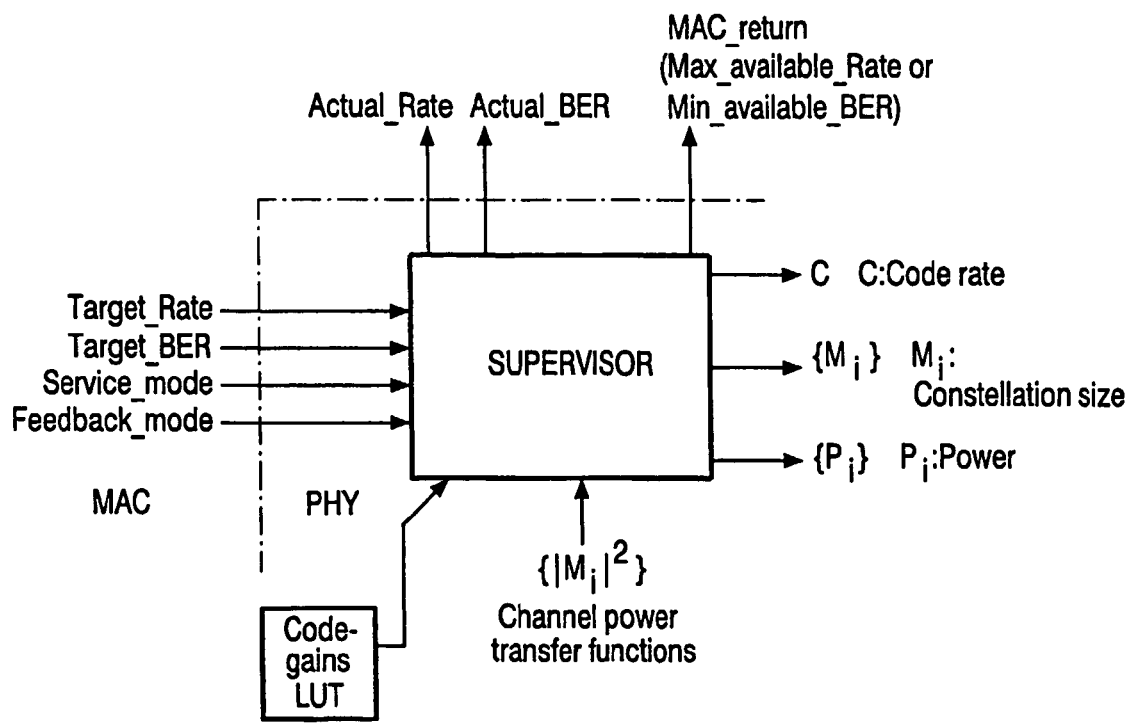
FIG. 3 is a more detailed schematic representation of the supervisor unit of FIG. 2.

In FIG. 2 is a schematic representation of an embodiment of a supervisor unit to be used in a system of FIG. 1 as specified above. As shown in FIG. 3 which is a more detailed schematic representation of the supervisor unit of FIG. 2, the supervisor is a building block, at physical layer, required to perform a real time system optimization. System optimization is a context-aware processing based on flexibility aiming at the real time minimization of a given cost function. A system is defined to be flexible if it is at least adaptive and/or re-configurable. The context could refer to the changing QoS requirements and channel conditions, while the cost function could be, for instance, the power (transmission and/or processing power). The supervisor inputs are a set of parameters from the physical and MAC layers. The supervisor outputs are both a set of parameters and directives to the physical and MAC layers. The target of the supervisor is to find the best output directives and parameter values to minimize the cost function given the current inputs.

The supervisor inputs are just parameters while its outputs can be both parameters and directives. The term directive refers to the indication of an action to be executed (e.g. the reconfiguration of some sub-blocks to fit the requirements of a selected algorithm).

The supervisor performs its optimization at PHY level and this allows a true real time optimization. The supervisor supplies also the $MAC_{out}$ information to the upper layer allowing MAC to perform its own optimization process.

Supervisor Algorithm: Processing Power Minimization

Continuing advances in VLSI and ASIC technology for low-power application can just help to reduce the impact of the power consumption on battery life and so they can offer just a partial solution. Some complementary countermeasures would be needed to get an effective result. So we tried to approach the same problem from the system level point of view.

Figure 4A:
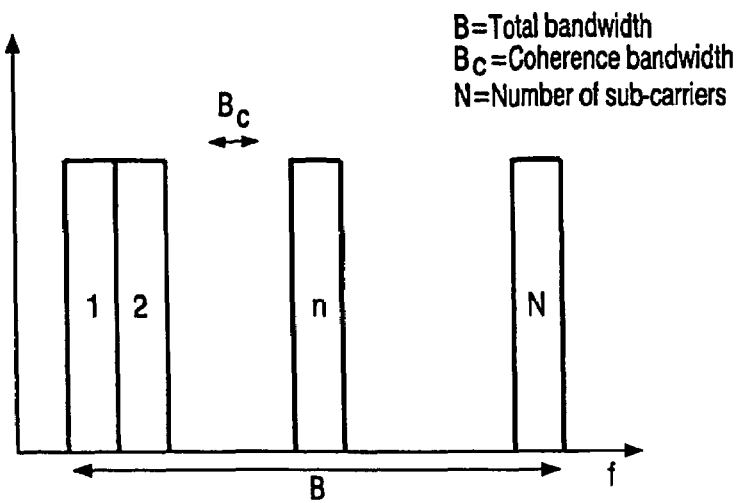
FIGS. 4A, 4B and 4C are graphical representations of full rate and reduced rate OFDM systems and down-scaled (I)FFT processing, respectively.
Figure 4B:
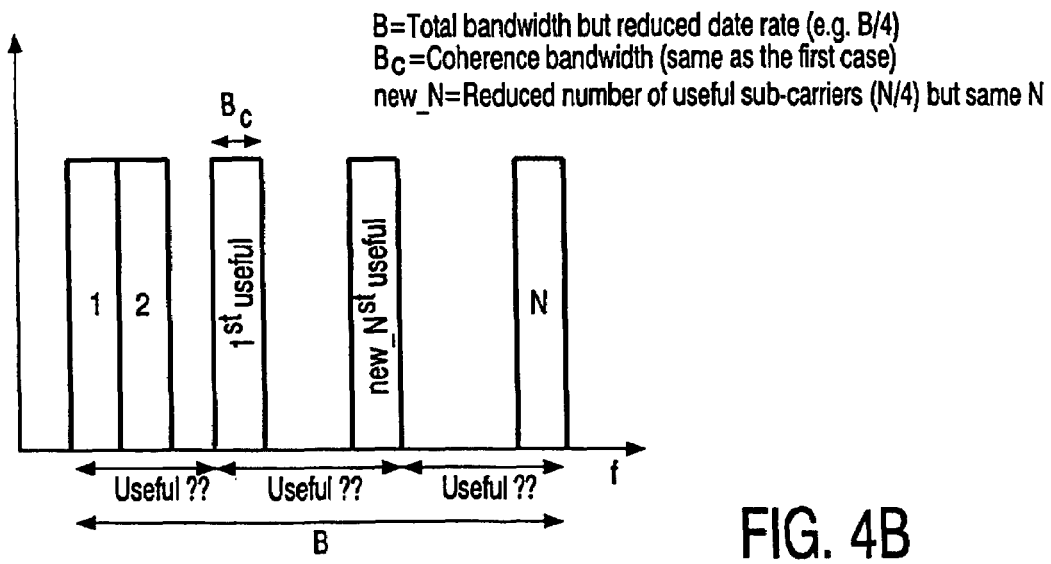
Figure 4C:
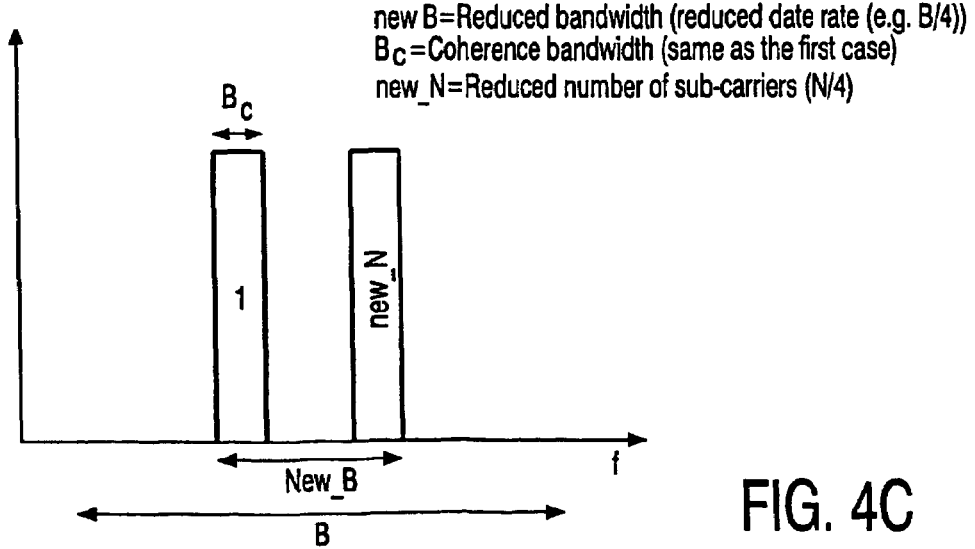
Figures 1, 5A:
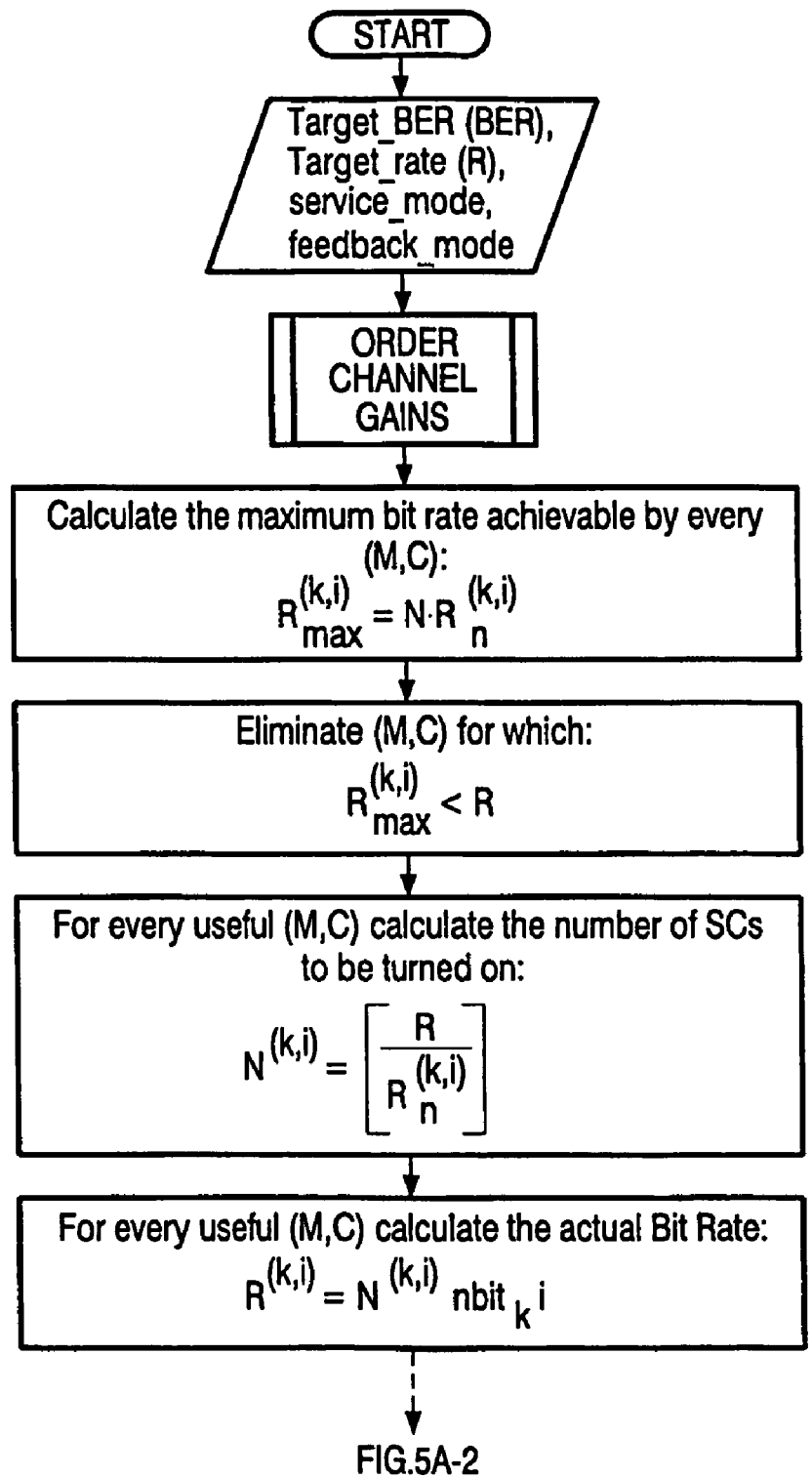
FIGS. 5A and 5B are a flow chart of an algorithm for an embodiment of the method to minimize transmission power parameters.
Figures 1, 5B:
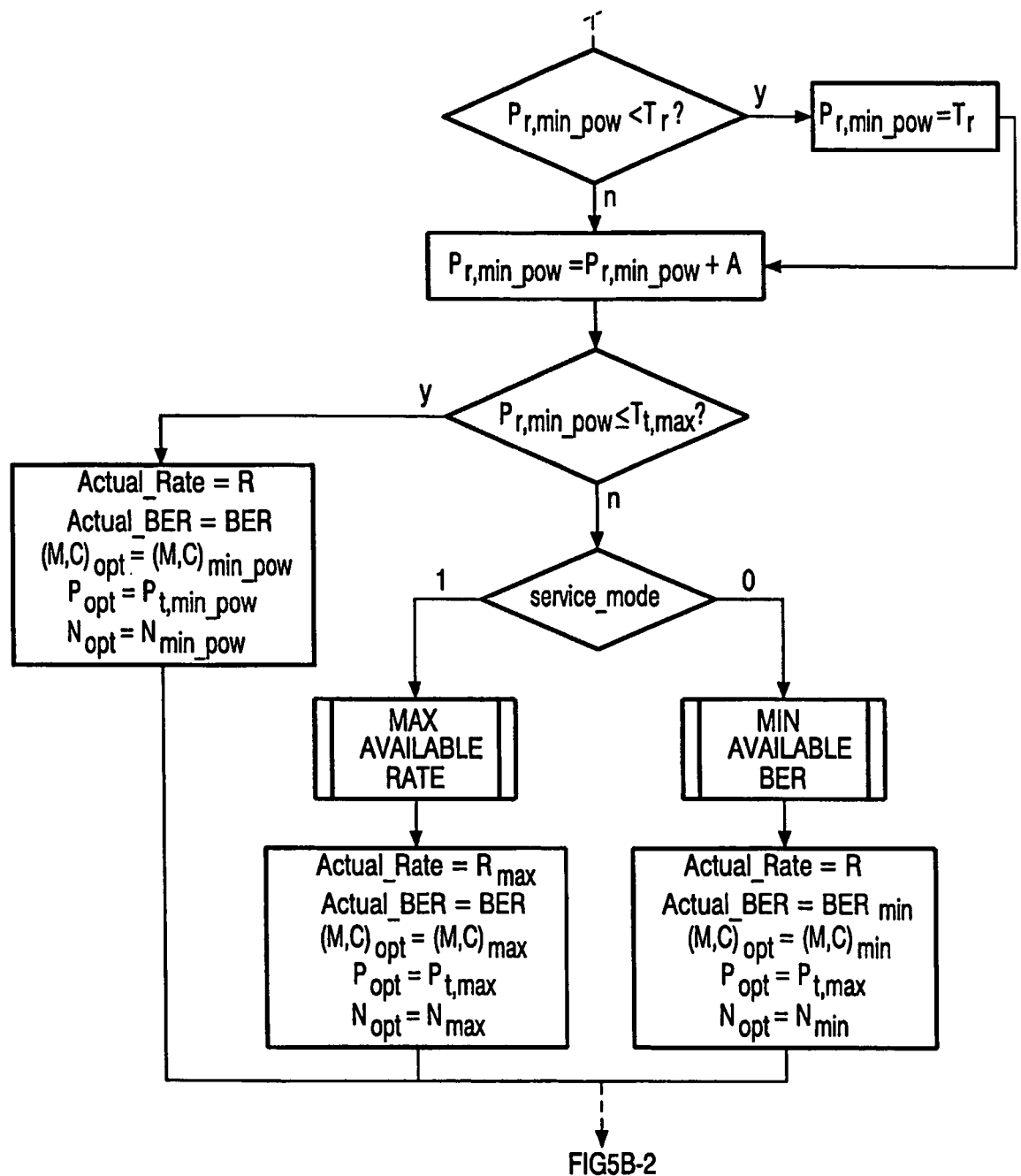
Figures 2, 5B:
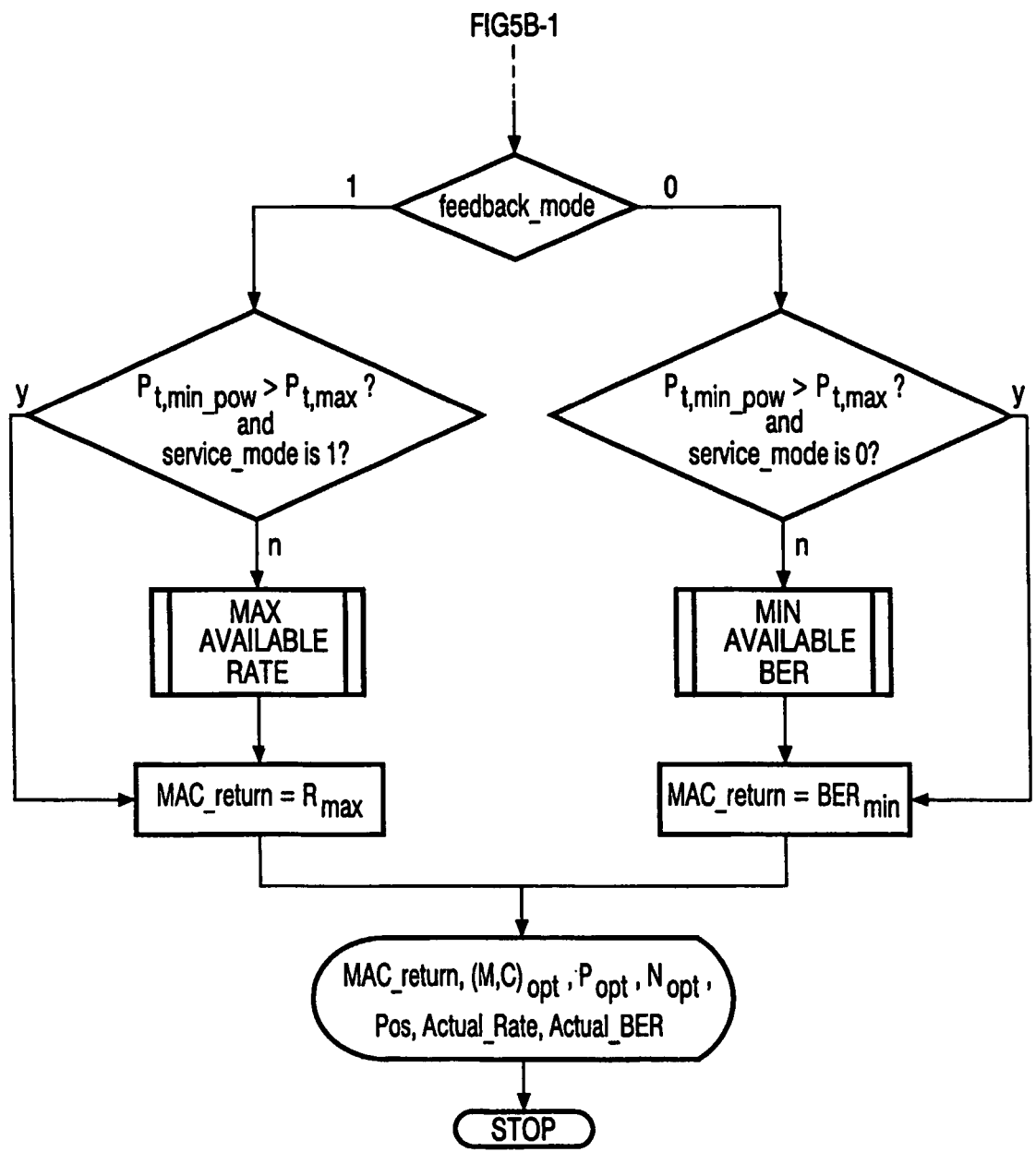
Figures 1, 6:
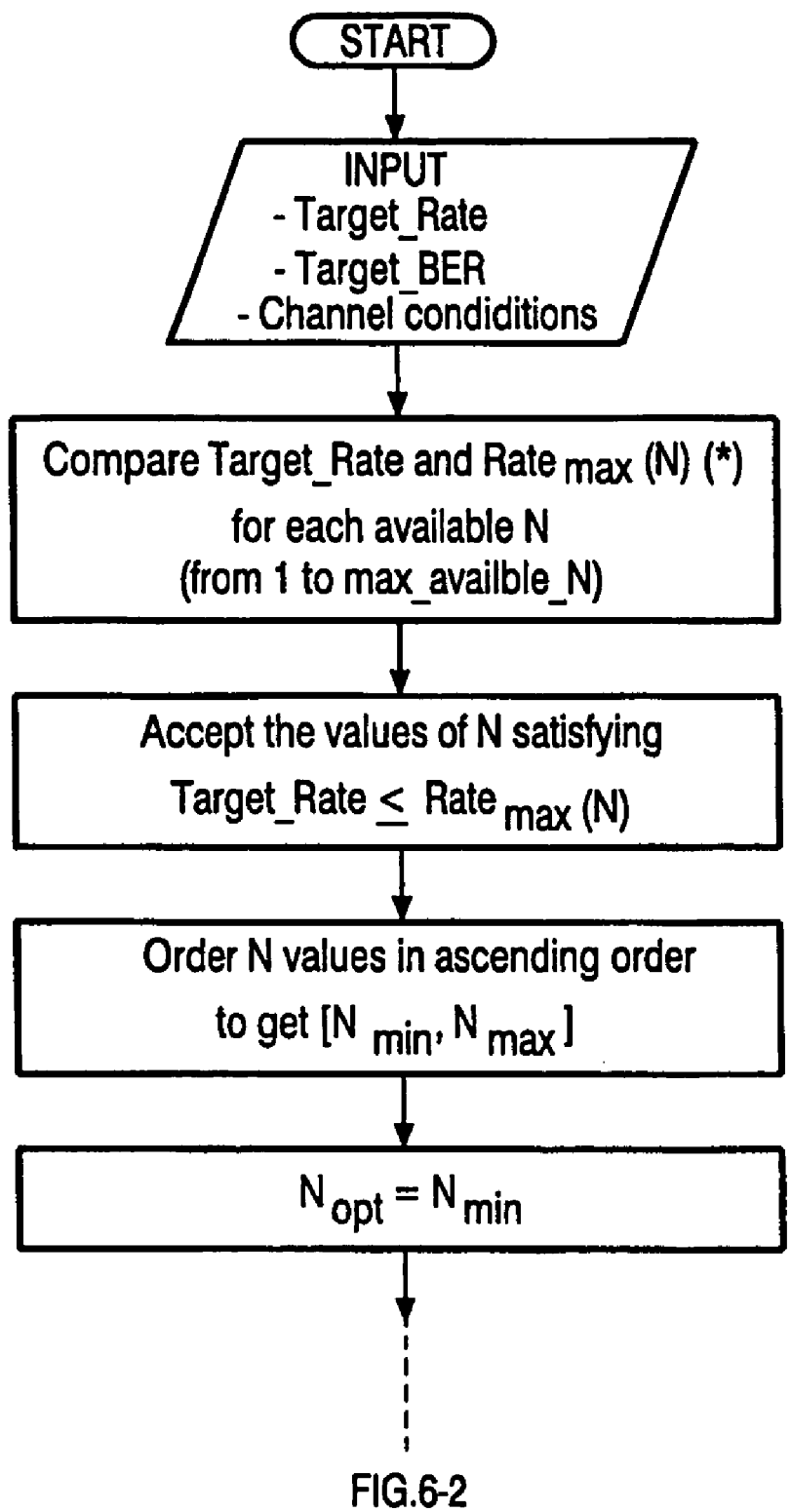
FIG. 6 is a flow chart of an algorithm for an embodiment of the method to minimize the processing power and just refers to the algorithm in FIGS. 5A and 5B for the transmission power minimization processing.
Figures 2, 6:
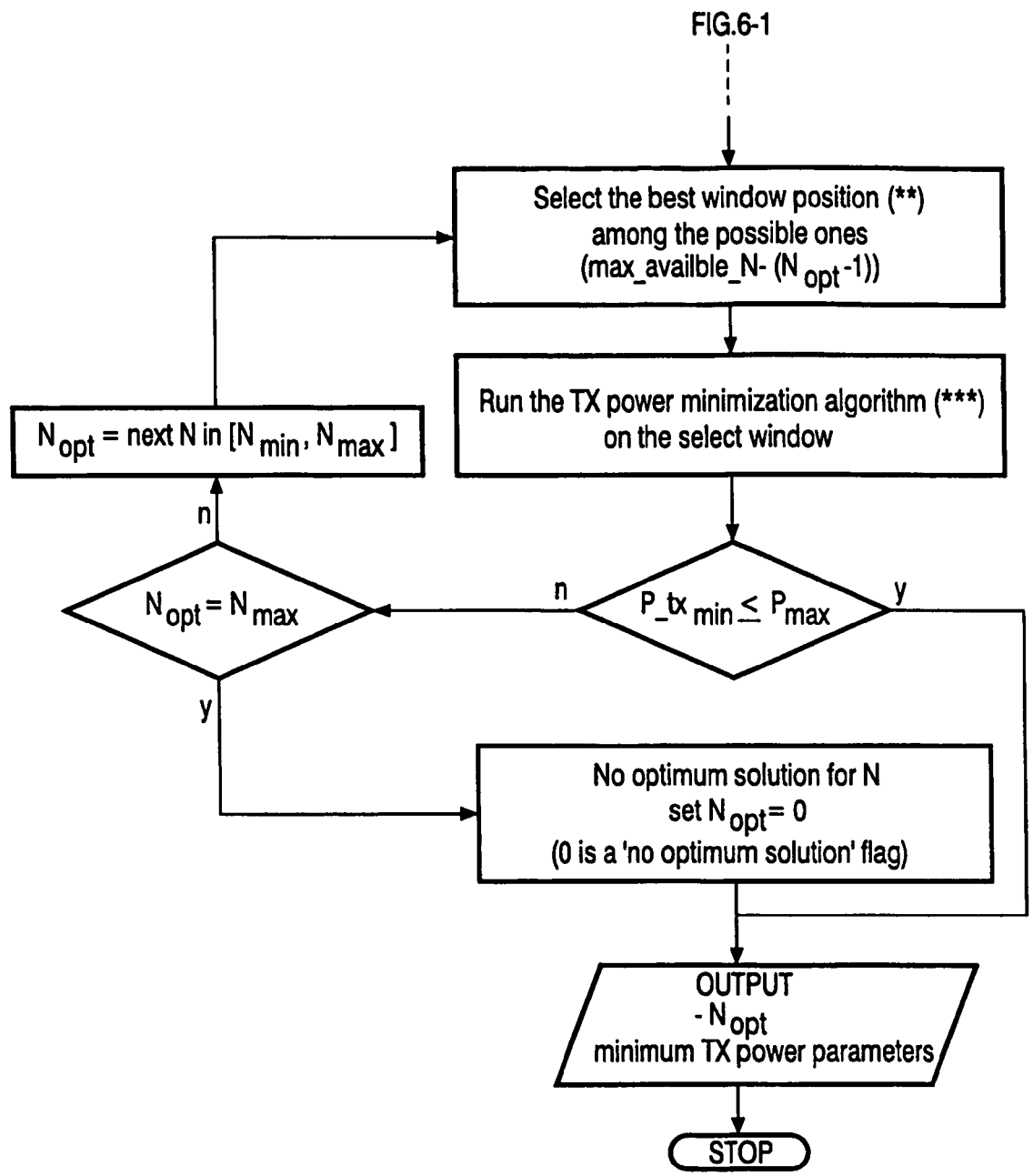
Figure 7:
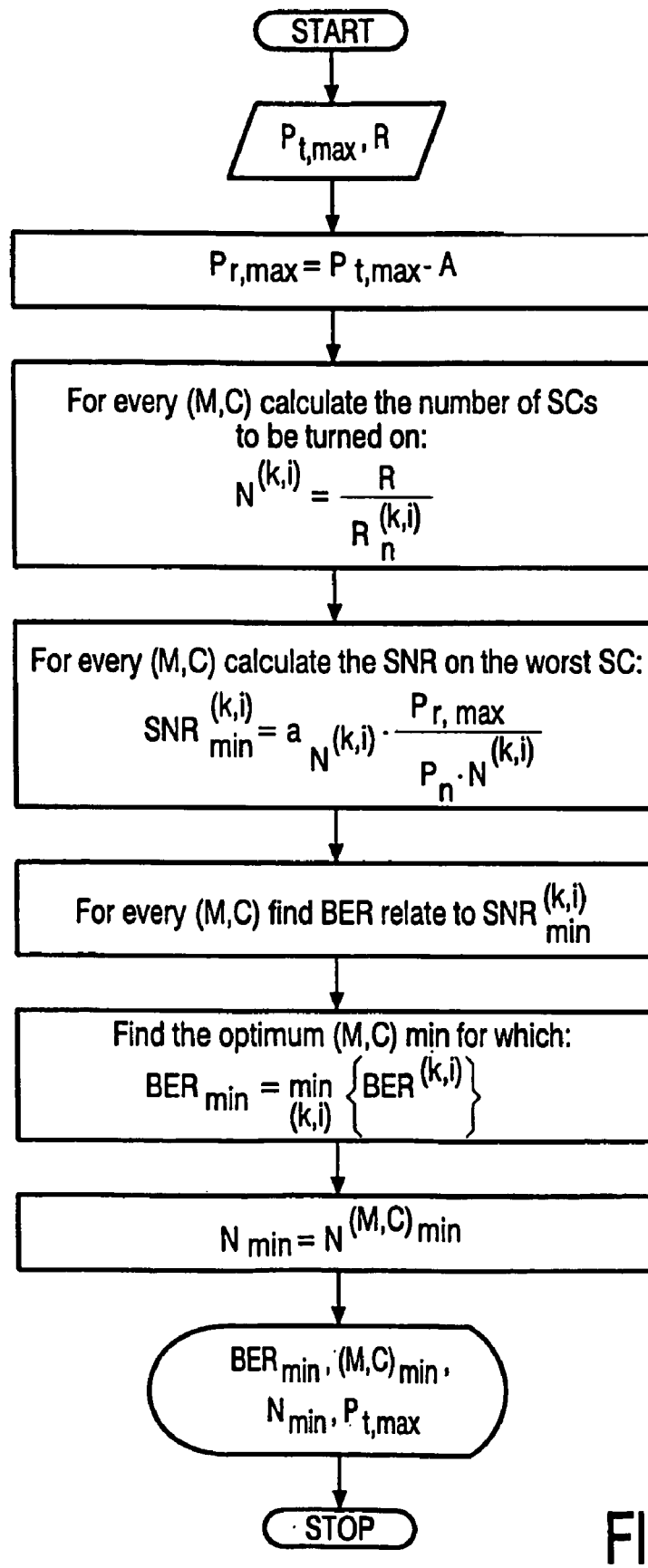
FIG. 7 is a flow chart of a procedure required by the embodiment of the method to minimize transmission power parameters (see FIGS. 5A and 5B) to obtain the minimum available BER.
Figure 8:
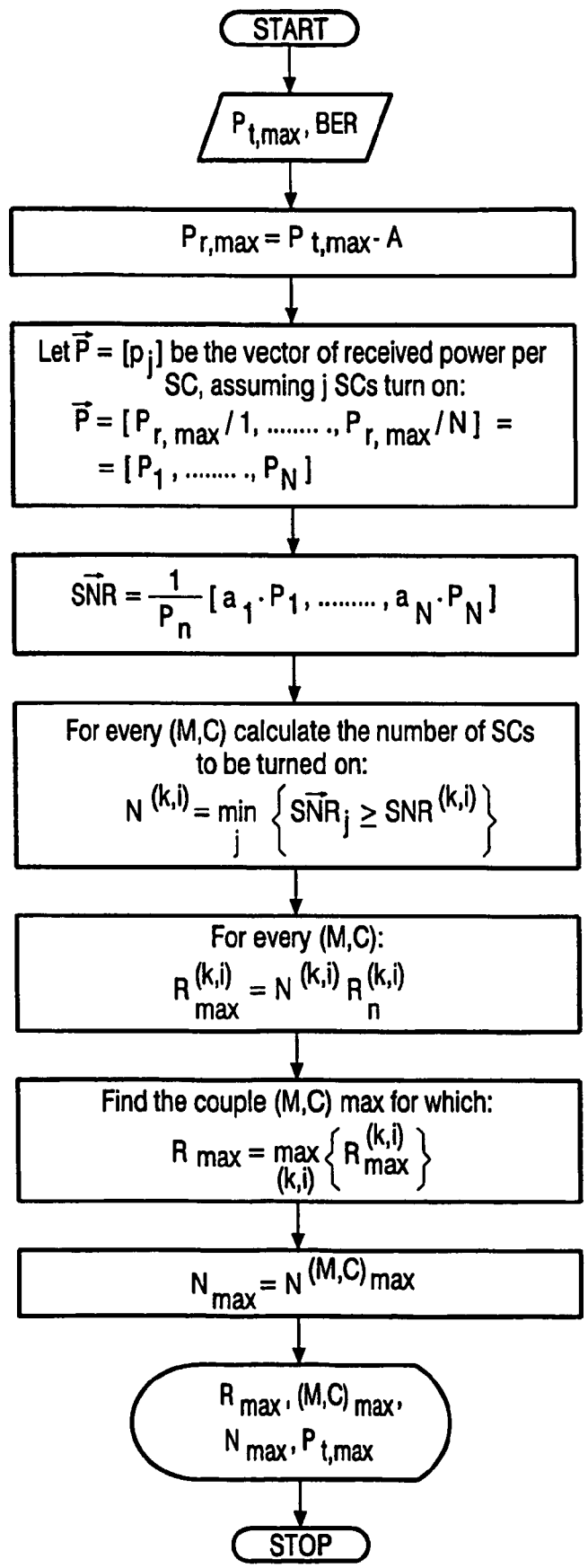
FIG. 8 is a flow chart of a procedure required by the embodiment of the method to minimize transmission power parameters to obtain the maximum available rate.
Figure 9:
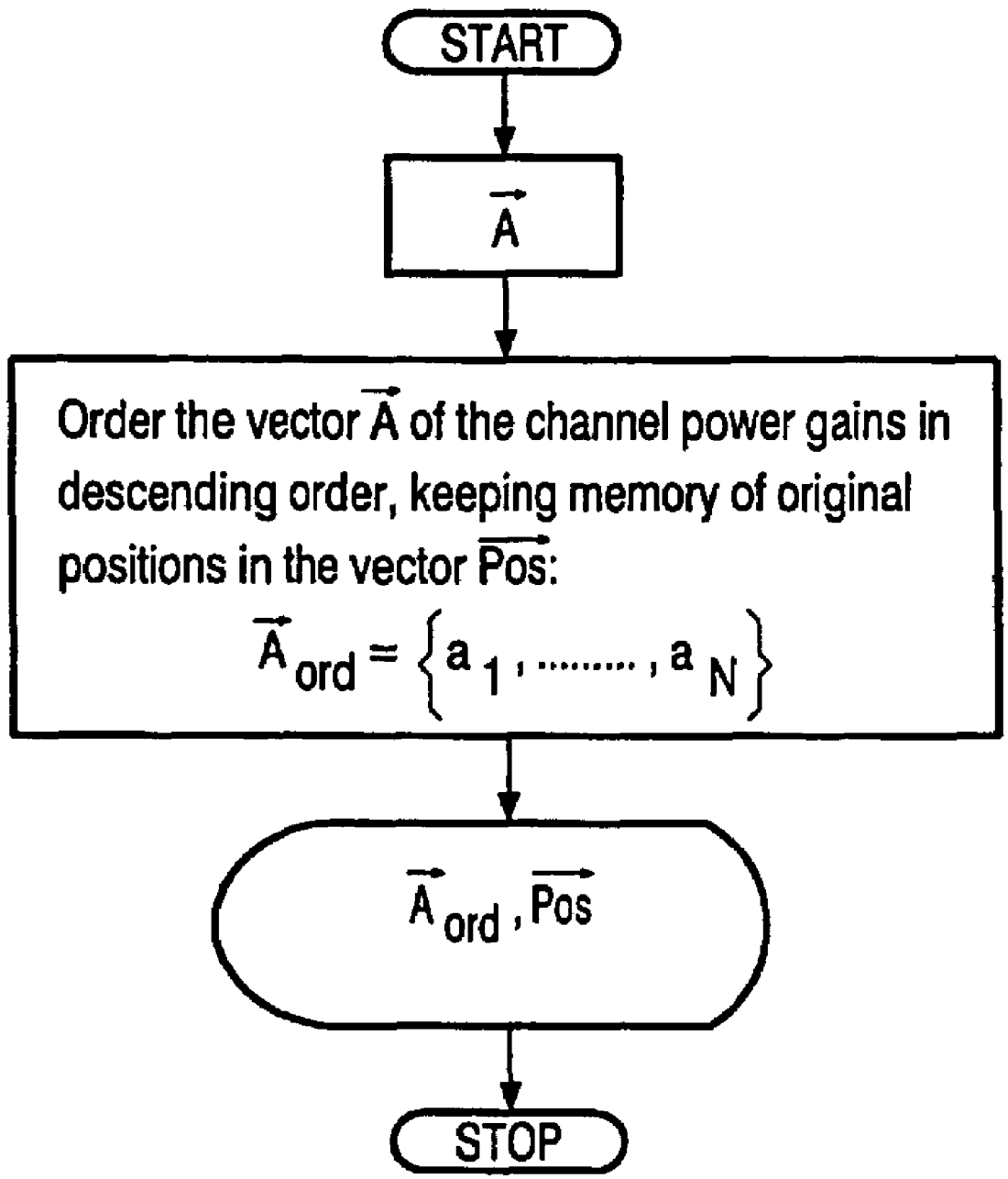
FIG. 9 is a flow chart of a procedure required by the embodiment of the method to minimize transmission power parameters to order the channel gains.

To be more specific, let us consider an OFDM-based system; assume that the rate is the main QoS requirement and that the transmitter knows the current channel condition. In traditional OFDM systems such information would be exploited just to find the best way to distribute bit and power aiming, for instance, at the transmission power minimization. Should the required rate be the maximum allowed by the specs or any other one, even if much lower, nothing would change from the processing power point of view. A low rate (e.g. full_rate/4) would be accommodated using less "active" sub-carriers (e.g. $N_{on}/4$), that is feeding the OFDM modulator (IFFT) with a certain number of zeros (see FIG. 4B). Though useful to save transmission power, this does not have an impact on the processing power: the processing block, the FFT, will continue to work at full speed, being the potential total bandwidth of same.

Suppose instead to have a scalable OFDM modulator/demodulator; this means the (I)FFT processing block is implemented in such a way that it can perform different lengths FFT at different speeds (FFT=fast Fourier transform, IFFT=inverse fast Fourier transform). In other words, if it is able to compute an N-point FFT with a clock frequency $f_{CLK}$ it is also able to perform an $N/2^n$-point FFT at $f_{CLK}/2^n$ (n=1, 2, ...). From the system point of view, this means that if not required by the rate constraint, the system can allocate a smaller potential bandwidth (e.g. B/4) for the current transmission so that it can work at a lower speed (e.g. $f_{CLK}/4$) (see FIG. 4A). This implies a huge reduction in the required processing power because this processing power is mainly due to the clock frequency. As a general rule, if the total bit rate that the device is required to provide is 1/K relative to the maximum, the clock frequency and the number of FFT/IFFT points will be reduced by this factor. In this way power consumption is reduced by $K^2*\log_2 N/\log_2(N/K)$.

Given such a scalable FFT, the problem exists to manage this system flexibility in order to optimize the transmission, aiming at minimizing the processing power required by the current channel condition and QoS constraints (Target_Rate and Target BER).

The algorithm works this way:
1. Accept Inputs:
   a. Target_Rate: required information rate
   b. Target_BER: required Bit Error Rate
   c. Channel condition $H=\{|H_i|^2\}$: set of the channel power transfer functions (index i refers to the $i^{th}$ sub-carrier (sub-channel))
2. Compare Target_Rate and Rate_(N) for each available N (from 1 to max_available_N). Rate_(N)=C_*log(M_)*N. It defines the maximum rate obtainable with a total number of sub-channels equal to N. Of course it refers to the highest code rate and constellation size available for the system under consideration.
3. Select and accept the values of N satisfying Target_Rate≦Rate_(N) This permits to discard the values of N that do not respect the rate constraint.
4. Order these values in ascending order to get [$N_{min}$, $N_{max}$]
   From the processing point of view $N_{min}$ would always be the optimum value, but, along with the process power, the transmission power has to be taken into account. Maybe that, with $N_{min}$ total sub-channels, high values C and M are necessary to get the Target_Rate and the corresponding transmission power, required to achieve the Target_BER, exceeds the maximum available. Of course, this also depends on the current channel condition experienced by the $N_{min}$ sub-channels. Suppose no (M,C) combination meets the transmission power constraint for the current channel condition. It means a higher total number of sub-channels is required with a new check procedure on transmission power. This "try and check" process needs to be repeated until the first solution is found. It must be noted that, in the "check" procedure, the position of the $N_{min}$ sub-channels with respect to the total bandwidth allocated to the system, is also very important because different positions correspond to different sets of channel coefficients. Assuming to have the possibility to shift, after the IF, the spectrum of the signal to be transmitted (there are max_available_N-($N_{opt}$-1) possible positions), this degree of freedom must be taken into account to improve the power minimization procedure.
5. Assume $N_{opt}=N_{min}$
   (a) Select the best window position among the possible ones (max_available N-( $N_{opt}$-1)).

This could be efficiently done before the transmission power minimization procedure, being the known minimization criterion (e.g. suppose the minimization is based on the worst sub-channel) then the best window is the one having the highest value for the worst sub-channel.
   (b) Run the adopted TX power minimization algorithm in the selected window.

To be more explicit, TX power minimization algorithm here refers to one of the possible algorithms, based on the channel state information, aiming at the selection of the transmission parameters that guarantee the required QoS (bit rate and BER) with the minimum transmission power (see supervisor algorithm: transmission power minimization).
   (c) Check if the transmission power constraint is satisfied. If so, jump to step 6, if not go to 5(d)
   (d) Check if another value is available in the set [$N_{min}$, $N_{max}$]. If so, choose the next (next_N) set N to next_N and jump to 5(a). If not, set $N_{opt}$=0. This will be interpreted as a flag meaning that no "optimum" solution for N exists.
6. Provide Outputs:
   a. $N_{opt}$
   b. Minimum TX power parameters This algorithm can be applied in every OFDM-based system in which a scalable IFFT/FFT is adopted. The maximum benefit deriving from this power saving feature is of paramount importance in mobile/portable wireless systems for which battery life is always an issue.

Supervisor Algorithm: Transmission Power Minimization

The minimum transmission power supervisor algorithm performs the real time adaptive system optimization in the supervisor unit. It is meant to optimize the transmission through frequency selective channels in coded OFDM (orthogonal frequency-division multiplex) based systems. Given the current channel condition, the algorithm determines the optimum combination of the transmission parameters to fit the QoS requirements coming from the MAC layer with the minimum transmission power. The combination has to be considered 'optimum' with reference to the low computational complexity required by the algorithm when compared to traditional solutions.

The supervisor performs its optimization at PHY level and this allows a true real time optimization. The supervisor supplies also the $MAC_{out}$ information to the upper layer allowing MAC to perform its own optimization process.

The processing unit interface is the interface between the processing unit block, e.g. the supervisor, the other PHY layer blocks and the MAC layer. This interface is meant for the minimization of the transmitted power given, as input parameters, the current channel conditions and QoS from MAC. The processing unit interface provides two different outputs, one towards the other PHY blocks and the other towards the MAC layer. The output interface towards the other PHY blocks is an appropriate set of transmission parameters sufficient to specify any flexible transmission system (i.e. block/convolutional/turbo coded single-/multi-carrier modulated system with/without bit and/or power loading). The output interface towards the MAC layer specifies the actual performance achieved and gives feedback information about the maximum available performance of the PHY layer with the current channel conditions. Such inputs and outputs are shown in FIG. 2 and in more detail in FIG. 3.

From MAC:
   QoS requirements at PHY layer:
   Target_Rate: required information rate
   Target_BER: required Bit Error Rate
   Max_Delay: max tolerable delay MAC feedback request type:

Service_mode [0/1]: one bit information to specify if MAC QoS requirements refers to a Rate guaranteed service or to a BER guaranteed service. In case the current channel conditions prevent satisfying requirements even with the maximum available power, this information determines whether with this power the Target_Rate will be guaranteed with the minimum available BER or the Target_BER will be guaranteed with the maximum available Rate.

Feedback_mode [0/1]: one-bit information to specify if MAC is interested to have feedback information on the "current" maximum available rate or the minimum available BER (see OUTPUTS) in order to define its next QoS request.

From PHY:

$H=\{|H_i|^2\}$: set of the channel power transfer functions (index i refers to the $i^{th}$ sub-carrier (sub-channel), for single-carrier systems no index is needed)

Output to PHY:

C: Code rate

B: Block length

N: number of decoding iterations (e.g. N=0 means that the channel coding is not a Turbo coding scheme, different values in the predefined available set specify the number of required decoding iterations)

$M=\{M_i\}$: set of codes to specify the generally different constellations adopted for the different sub-channels (e.g. $M_i=0$ means that the $i^{th}$ sub-channel is OFF, different values specify constellation types in the predefined available set)

$P=\{P_i\}$: set of the generally different transmission powers adopted for the different sub-channels (e.g. $P_i=0$ means that the $i^{th}$ sub-channel is OFF)

Output to MAC:

Actual_Rate: rate actually determined for the current transmission. It is expected to be equal to or greater than the Target_Rate, but it can also be smaller in case the current channel conditions prevent satisfying requirements even with the maximum available power. In this case, if the service is a BER guaranteed one, this value is equal to the maximum available Rate.

Actual_BER: BER actually determined for the current transmission. It is expected to be equal to or smaller than the Target_BER, but it can be also greater in case the current channel conditions prevent satisfying requirements even with the maximum available power. In this case, if the service is a Rate guaranteed one, this value is equal to the minimum available BER.

MAC_return: Depending on the Feedback-mode request from MAC, the Max_available_Rate or the Min_available_BER is provided after the optimization processing.

Max_available_Rate: maximum available rate for the current channel condition as far as BER and tolerable delay requirements are respected. This rate is obtained if the total power equals the maximum defined by the system specifications.

Min_available_BER: minimum available BER for the current channel condition as far as rate and tolerable delay requirements are respected. This BER is obtained if total power equals the maximum defined by the system specifications.

Within this framework of high-performance, flexible, QoS-aware, low-power digital transceivers, a reduced-complexity algorithm for fast, joint optimization of the transmission parameters in OFDM indoor wireless systems is based on the sub-carrier switching concept, is handled by the supervisor unit, that is the basic processing and control unit of any adaptive and re-configurable system, and is meant to perform real time a predefined system optimization. The proposed algorithm dynamically determines the modulation and channel coding parameters for an OFDM-based system operating in frequency-selective environments. Based on the channel state information, the algorithm selects the transmission parameters that guarantee the required QoS (bit rate and BER) with the minimum transmission power.

The core of the supervisor algorithm calculates the optimum constellation size, channel code rate, number and position of active sub-carriers (sub-channels) and transmit power for an OFDM based transmission through frequency-selective channels. Optimum here means that the parameters chosen by the supervisor algorithm guarantee, for the current channel condition, the bit rate and the BER requested by the MAC sub-layer with the "minimum" transmit power. The power has to be considered the "minimum" obtainable with respect to the low complexity of the algorithm. The supervisor algorithm makes use of the sub-channel switching (i.e. does not use highly attenuated sub-channels if not strictly necessary to get the requested rate) and this is the reason why also the current number and position of ON sub-channels are part of the output information.

If the "minimum" power computed is greater than the maximum available power in the system, this maximum value is assumed to be the current "minimum" power and the algorithm is able to provide also one out of two possible sub-optimum solutions, depending on the type of service. In this case the supervisor algorithm provides either the maximum available bit rate for the required BER along with the corresponding set of parameters or the value of the minimum BER for the required bit rate along with the corresponding parameters. The first solution is intended for BER sensitive services (file transfer) while the second is suitable for Rate sensitive services (real time voice/video).

The following assumptions are made:

1. The OFDM based transmission can be considered equivalent to N parallel and independent single-carrier transmissions,
2. Every sub-band can be modeled as an AWGN channel with a flat channel response defined by a complex coefficient H,
3. The mean path loss and the channel power gain $a=|H|^2$ for every sub-channel, experienced at the receiver, are known at the transmitter,
4. The transmit power, as well as the single-carrier constellation, are the same for every ON sub-channel,
5. Code rate is the only adjustable parameter of the coding scheme,
6. The coding gain in AWGN channels for each available constellation and code rate is known.

The supervisor algorithm receives input data from the MAC sub-layer (the required BER and bit rate) and from the physical layer (the channel state information, i.e. the channel power gains, one per sub-channel). Moreover, it can access static data from an internal LUT (Look-Up Table), such as the code gains for every couple constellation/code rate M/C in AWGN channel. Feedback mode input simply specifies whether the MAC, after the optimization procedure, is interested to receive back the information (called MAC_return) about the current maximum available rate or the minimum available BER. Instead, the Service mode flag signals to the SV the type of service: one is for a guaranteed BER service, zero is for a guaranteed bit rate service. The output of the processing are the "optimum" couple M/C, the number and position of required sub-channels and the transmit power necessary to achieve the BER and bit rate requested by the MAC sub-layer. The transmit power is the "minimum" one required to obtain the target QoS with a low complexity optimization algorithm. The supervisor algorithm algorithm also returns to the MAC sub-layer the actual bit rate and BER achieved, which should always be equal to or better than the required ones. In case the channel conditions prevent achieving the required QoS, the supervisor algorithm sets up all the parameters of the current transmission aiming at the Maximum Available Rate or at the Minimum Available BER, for guaranteed BER services or guaranteed bit rate services respectively (Service_mode specifies service type). In each case the algorithm also provides MAC with feedback information about the maximum performance obtainable with the current channel condition: the Maximum available rate or the Minimum available BER. MAC specifies which value it is interested in by means of the Feedback_mode flag. Feedback information can support MAC in determining the next QoS request.

Description of Detailed Algorithm

As stated above, the supervisor algorithm is able to solve the problem of finding the "minimum" power solution:

(I) Find the M/C couple, the number and the position of the ON sub-channels required to fit the Target_Rate and the Target_BER requirements with the minimum power, given the current channel condition.

In case the channel conditions prevent achieving the required QoS, even with the maximum available power, the supervisor algorithm sets up all the parameters of the current transmission aiming at the maximum available rate or at the minimum available BER, for guaranteed BER services or guaranteed bit rate services respectively (Service_mode specifies service type). So it is able to solve also the following problems:

(Ia) Find the M/C couple, the number and the position of the ON sub-channels required to get the Maximum Rate compatible with the Target_BER requirement, given the current channel condition and the maximum power allowed by the system specifications.

(Ib) Find the M/C couple, the number and the position of the ON sub-channels required to get the Minimum BER compatible with the Target_Rate requirement, given the current channel condition and the maximum power allowed by the system specifications.

Minimum Transmission Power for a Target Rate and a Target BER

The input data from the MAC layer are: Target_BER and Target_Rate R. It should be noted that the very same algorithm can be adapted to find the minimum power required to satisfy the Target_BER by turning off a pre-set number of sub-channels (e.g. 8%): just consider $(1-\alpha)N$ instead of N in step 1 ($\alpha$ is the fraction of OFF sub-channels) and skip step 3a ($N^{(k,i)}=(1-\alpha)N$).

1. Calculate the maximum bit rate achievable by every couple M/C, identified by modulation k and code-rate i, with all sub-channels turned on:

$$R_{max}^{(k,i)} = N \cdot R_n^{(k,i)}, \; R_n^{(k,i)} = nbit_k C^i \tag{1}$$

where N is the total number of sub-channels, $R_n^{(k,i)}$ is the pre-coded bit rate carried by the nth sub-channel by making use of modulation k and code-rate i, $C^i$ is the code-rate, $nbit_k$ is the number of bits per modulation symbol. Note that this calculation can be performed off-line at initialization time.

2. Eliminate the couples M/C for which the maximum achievable bit rate is less than the requested one: $R_{max}^{(k,i)} < R$.

3. For every couple useful M/C:
a. calculate the minimum number of sub-channels required to achieve the bit rate B:

$$N^{(k,i)} = \left\lceil \frac{R}{R_n^{(k,i)}} \right\rceil \tag{2}$$

where $\lceil . \rceil$ denotes the rounding up to the next integer. It should be noted that, in real implementations, the number of sub-channels is calculated so as to place an integer number of information bits per OFDM symbol. The way eq. (2) is rounded up, however, has no consequence for the remaining steps of the algorithm.

2. Derive, from simulation-based curves, the SNR necessary to obtain the required BER in the AWGN case (*). Let $SNR_{sub-channel}^{(k,i)}$ be the SNR required, for a single sub-channel, to operate @BER when using modulation k and channel coding i, assuming an AWGN channel:

$$SNR_{SC}^{(k,i)} = SNR_{SC}^{k} - G_c^i \tag{3}$$

where $SNR_{sub-channel}^{k}$ is the uncoded SNR required by modulation k and $G_c^i$ is the coding gain i(dB). Then, using $N^{(k,i)}$ sub-channels, the received power will be:

$$P_{r,AWGN}^{(k,i)} = P_n snr_{SC}^{(k,i)} N^{(k,i)}, \text{(not dB!)} \tag{4}$$

$P_n$ is the white-noise power in the nth sub-channel band, and $snr_{sub-channel}^{(k,i)}$ the signal-to-noise ratio for modulation k and code i.

(*) This is the best way to derive the relation between BER and SNR for the single carrier coded modulation: no complex analytical relations, when obtainable, have to be worked out. It is worth to be underlined that the real channel is not supposed to be AWGN. This step is just a starting point for the algorithm, in which the real channel is considered in step 3c.

c. Let $\vec{A} = \{a_1, a_2, \ldots, a_N\}$ be the vector of the channel power gains for all N sub-channels. Let us assume, without loss of generality, that $\vec{A}$ has been ordered in descending order and consider the leading $N^{(k,i)}$ components:

$$\vec{A}^{(k,i)} = \{a_1, a_2, \ldots, a_{N^{(k,i)}}\} \tag{5}$$

Then $a_{N^{(k,i)}}$ is the lower gain among the $N^{(k,i)}$ necessary sub-channels: if the SNR on this sub-channel is greater than or equal to the required $SNR^{(k,i)}$ (for modulation k and code-rate i), then the very same condition will obviously hold for all the $N^{(k,i)}$ sub-channels. The signal power at the receiver must be such that the above condition applies for the worst sub-channel, i.e. the received signal power calculated in step 3 must be scaled by the factor $1/a_{N^{(k,i)}}$:

$$P_r^{(k,i)} = (1/a_{N^{(k,i)}}) \cdot P_{r,AWGN}^{(k,i)} \tag{6}$$

d. Calculate the total received power for all $N^{(k,i)}$ sub-channels:

$$P_{r,tot}^{(k,i)} = P_r^{(k,i)} \cdot N^{(k,i)} \tag{7}$$

4. The "optimum" couple M/C $((M,C)_{min\_pow})$ is the one which minimizes $P_r^{(k,i)}$ (**):

$$P_{r,min\_pow} = \min_{(k,i)} \{P_{r,tot}^{(k,i)}\} \tag{8}$$

If the minimum receive power (8) is below the sensitivity threshold $T_r$ of the receiver, then the additional delta of power $$\Delta P = T_r - P_{r,min\_pow} \tag{9}$$

is considered for the optimum couple, i.e. the receive power is set equal to the sensitivity threshold:

$$P_{r,min\_pow}=T_r \quad (10)$$

(\*\*) This is just an upper bound for the minimum required power but, to our knowledge, there is no way to derive the real BER of the whole coded OFDM symbol from the different BER of the various sub-channels. Even if there were such a relation it would probably be too complex to implement. A system design based on the above introduced upper bound can be considered in every case a good trade-off between complexity and performance.

5. The couple $(M,C)_{min\_pow}$ can achieve the actual rate $R_{min\_pow}=N_{min\_pow} \cdot nbit_k \cdot C^i$ and the BER requested by the MAC sub-layer by using $N_{min\_pow}$ sub-channels and with the minimum possible transmit power, given by:

$$P_{t,min\_pow}=P_{r,min\_pow}+A(\text{dB}) \quad (11)$$

where A is the mean path loss in dB. If $P_{t,min\_pow}$ is greater than the maximum transmit power $P_{t,MAX}$ of the system, then the supervisor algorithm returns the couple M/C yielding @$P_{t,MAX}$, either the maximum available bit rate at given BER, or the minimum BER at given bit rate, depending on Service mode specification. In any case the supervisor algorithm supplies the MAC_return value (maximum available rate $R_{max}$ or minimum available BER $BER_{min}$) and all the optimum outputs of the current transmission (Actual_Rate, Actual_BER, $(M,C)_{opt}$, $N_{opt}$ and $P_{opt}$) to the MAC sub-layer.

Maximum Available Rate for a Target BER and a Given Power

In this case, the starting information is the maximum transmit power and the Target_BER. This function is called either if service mode is set to 1 (if $P_{t,min\_pow}>P_{t,MAX}$) or if feedback mode is set to 1.

1. Calculate the maximum received power:

$$P_{r,max}=P_{t,max}-A(\text{dB}) \quad (12)$$

where A is the mean path loss.

2. Let $\vec{A}=[a_1, a_2, \ldots, a_N]$ be the vector of the channel power gains for all N sub-channels, in descending order, and let $\vec{P}=[p_j]=[P_{r,MAX}/1, P_{r,Max}/2, \ldots, P_{r,Max}/j, \ldots, P_{r,Max}/N]$ be the vector of received power per sub-channel, assuming j sub-channels turned on. Then it is straightforward to calculate the minimum SNR on the weakest sub-channel, for every number j of sub-channels considered and store the result in a vector:

$$\vec{SNR}=\frac{1}{P_n}[a_1 p_1, a_2 p_2, \ldots, a_N p_N] \quad (13)$$

Note that the j-th element $$\frac{a_j P_{r,Max}}{j P_n}$$

is simply the SNR on the worst sub-channel among the j sub-channels considered. Note also that the SNR vector is ordered in descending order.

3. For every couple M/C:
a. calculate the number of sub-channels having an SNR above the threshold yielding the BER requested by the MAC sub-layer:

$$N^{(k,i)}=\min_j\{\vec{SNR}_j \geq SNR^{(k,i)}\} \quad (14)$$

where the function $$\min_j\{cond\}$$

returns the minimum index j for which the condition cond holds.

4. Calculate the bit rate achievable using $N^{(k,i)}$ sub-channels:

$$R_{MAX}^{(k,i)}=N^{(k,i)} R_n^{(k,i)} \quad (15)$$

5. Find the M/C (called $(M,C)_{max}$) yielding the maximum bit rate:

$$R_{MAX}=\max_{(k,i)}\{R_{MAX}^{(k,i)}\} \quad (16)$$

and $N_{max}$ is the $N^{(k,i)}$ sub-channels for $(M,C)_{max}$.

Minimum Available BER for a Target Rate and a Given Power

The starting information is the maximum transmit power and the Target_Rate. This function is called either if service mode is zero (if $P_{t,min\_pow}>P_{t,MAX}$) or feedback mode is zero.

1. Calculate the maximum receive power:

$$P_{r,max}=P_{t,max}-A(\text{dB}) \quad (17)$$

where A is the mean path loss.

2. For every M/C:
a. calculate the number of sub-channels used to achieve the bit rate R:

$$N^{(k,i)}=\frac{R}{R_n^{(k,i)}} \quad (18)$$

b. the SNR (signal-to-noise-ratio) on the worst sub-channel is:

$$SNR_{MIN}^{(k,i)}=a_{N^{(k,i)}}\frac{P_{r,MAX}}{P_n N^{(k,i)}} \quad (19)$$

c. The BER corresponding to the worst sub-channel can be calculated from the BER-SNR curve for modulation k and code-rate i.

3. Find the M/C (called $(M,C)_{min}$) yielding the minimum value:

$$BER_{MIN}=\min_{(k,i)}\{BER^{(k,i)}\} \quad (20)$$

and $N_{min}$ is the $N^{(k,i)}$ sub-channels for $(M,C)_{min}$.

Several simulations have been performed in the WIND-FLEX scenario. The WIND-FLEX system architecture is based on Turbo channel coding, OFDM modulation scheme and provided with a supervisor unit for real time system optimization.

Figure 10A:
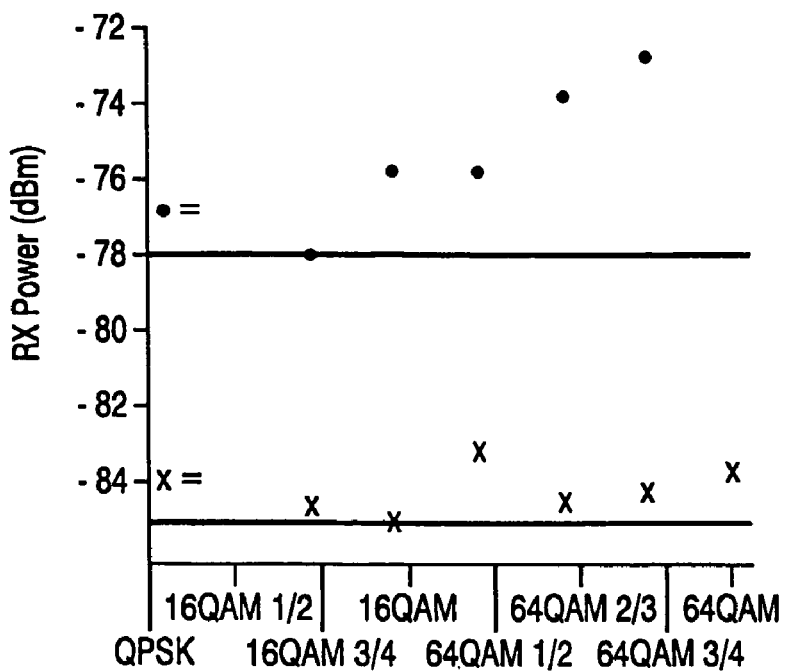
FIGS. 10A, 10B and 10C show performance results obtained by applying the method using the algorithm.
Figure 10B:
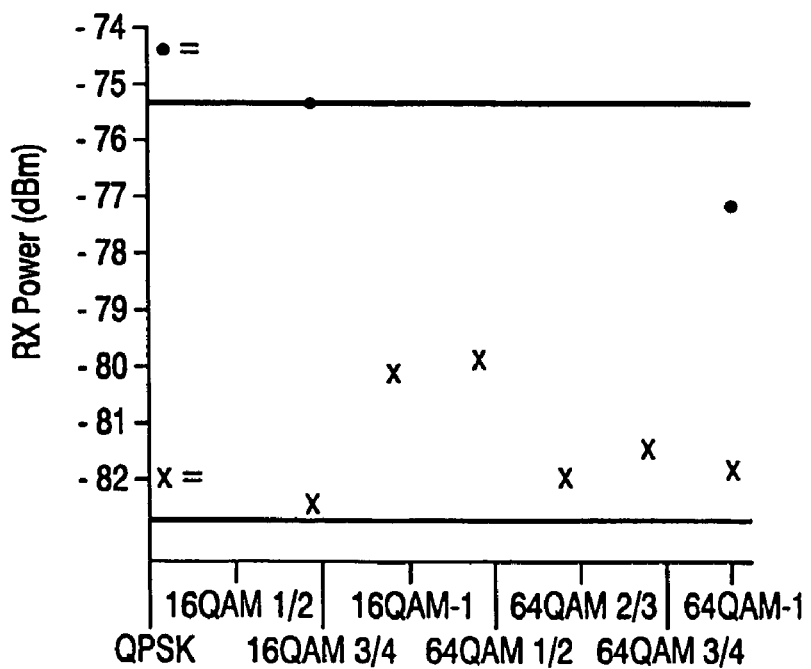
Figure 10C:
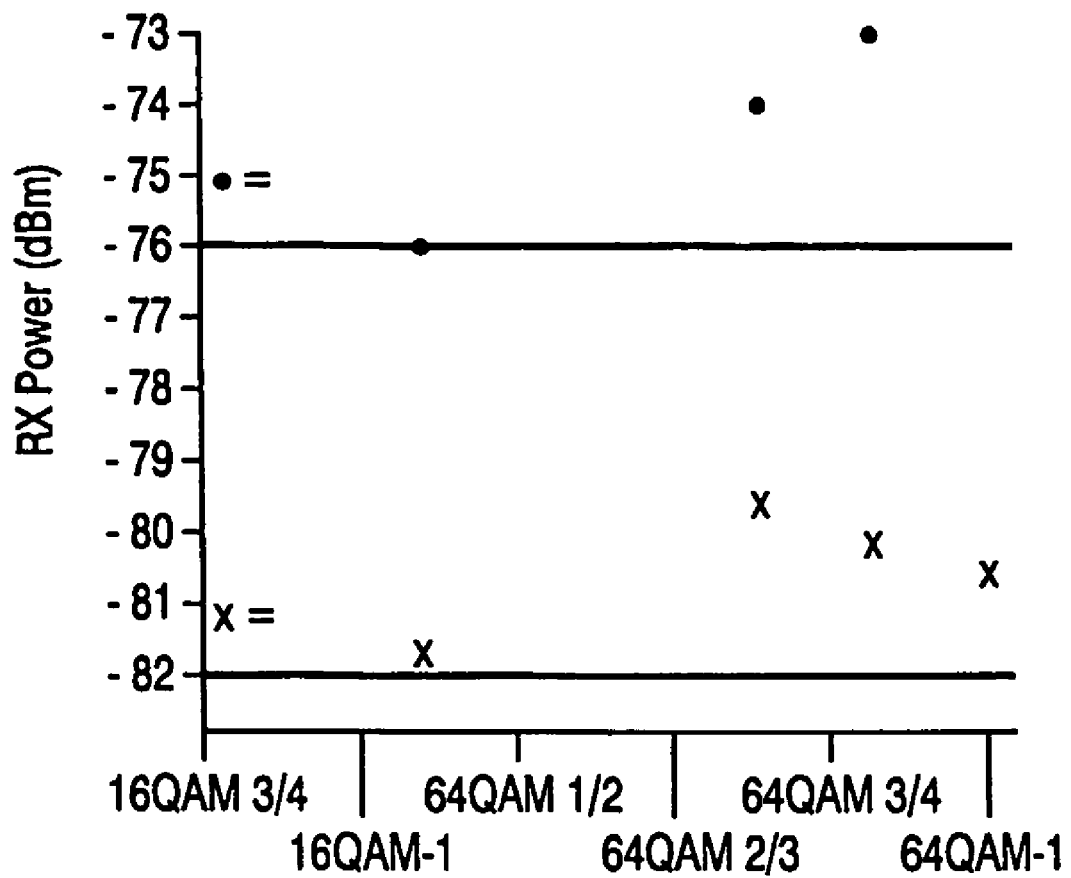

FIGS. 10A, 10B and 10C show performance results obtained by applying the method using the supervisor algorithm, compared to the performances without a supervisor algorithm implemented. FIGS. 10A, 10B and 10C show the mean RX power of a NLOS channel versus the available sub-carrier modulation schemes BPSK (binary phase shift keying), QPSK (quadrature phase shift keying), 16-QAM and 64-QAM. In FIG. 10A, the transmission rate is 72 Mbit/s and the @BER is 1e−5, in FIG. 10B the transmission rate is 72 Mbit/s and the @BER is 1e−6 and in FIG. 10C the transmission rate is 108 Mbit/s and the @BER is 1e−5. The available sub-carrier modulation schemes are adaptively chosen. The total number of useful sub-carriers is 100, but a variable number of sub-carriers can also be adaptively switched-off (sub-channel switching).

The coding scheme is a parallel convolutional turbo code. The available code rates are ½, ⅔ and ¾ and the block length is adaptive and dependent on the triplet: code rate, constellation size, and number of ON sub-carriers.

The 17 GHz channel model provided by the WIND-FLEX Consortium has been adopted. The channel exhibits a frequency-selective behavior, which translates into few deep fades in the 50 MHz-wide spectral response.

The worst-case scenario, i.e. NLOS channel and maximum distance from the transmitter (5 meters), has been considered. For each simulation 10000 channel realizations have been used, that is: the supervisor algorithm was run 10000 times, and for every channel realization the "optimum" couple M/C was found, giving the required QoS with the minimum transmit power. Note that the optimum couple—and the required power—is not always the same for different channel realizations. The bottom horizontal line is the minimum power line and, in the graphs, defines the minimum average received power required. It is obtained by selecting the received power of the optimum M/C couple for each channel realization and then averaging over the total number of channel realizations. The graphs also show the average power required by each couple M/C. Some couples are missing, because they would require a power level higher than the maximum allowed by system specifications (10 dBm EIRP transmit power).

Note that when no supervisor algorithm is applied, the optimum couple M/C is always the same for every channel realization (e.g. 16 QAM with ¾-rate convolutional turbo coding in FIG. 10A, therefore the level of the minimum power line is defined by the average power required by this modulation/coding scheme. When the supervisor algorithm is applied, on the other hand, the optimum couple may change, therefore the minimum power line does not generally correspond to the power level required by a single couple (FIG. 10B and FIG. 10C). Note also the significant amount of power saved by using the supervisor algorithm, especially when high bit rates/low BERs are requested by the MAC layer.

A simple and effective algorithm that can be run by any adaptive, QoS-aware, OFDM receiver has been developed and proposed. The algorithm is based on the sub-carrier switching technique and is able to solve the problem of finding the modulation/coding scheme and the number and position of the ON sub-carriers required to satisfy the Target_Rate and the Target_BER requirements with the "minimum" power, given the current channel condition. The proposed solution can be considered a good trade-off between complexity and performance with respect to the theoretical optimum given by the "water filling" solution. Moreover, this reduced-complexity algorithm is suitable for the real time applications. The supervisor algorithm, as described in this paper, gives just an upper bound for the minimum required power. A way to derive the real BER of the whole coded OFDM symbol from the different BER of the various sub-channels is under investigation in the WIND-FLEX project framework.

To summarize a preferred embodiment, a method for minimizing processing and transmission power in a flexible and reciprocal OFDM wireless communication system including a MAC layer and a PHY layer, said PHY layer including a supervisor unit controlling in real time the performance of the PHY layer is disclosed. The method comprises feeding a first set of input data as to the QoS requirements at the PHY layer from the MAC layer to the supervisor unit comprising a Target_Rate (required information rate), a Target_BER (required Bit Error Rate) and a Max_Delay (max tolerable delay); feeding a second set of input data including channel power transfer functions $H=\{|H_i|^2\}$: (index i refers to the $i^{th}$ sub-carrier) from PHY layer to the supervisor unit; processing the first and second set of input data for minimizing processing and transmission power in a wireless communication network system; and outputting N, modulation and coding parameters and transmission power parameters to the PHY layer. The coding parameters and transmission power parameters to the PHY layer include C: Code rate data; B: Block length data; n: data as to the number of decoding iterations; $M=\{M_i\}$: data as to a set of codes to specify the generally different constellations adopted for the different sub-channels (e.g. $M_i=0$ means that the $i^{th}$ sub-channel is OFF, different values specify constellation types in the predefined available set); and $P=\{P_i\}$: data as to a set of the generally different transmission powers adopted for the different sub-channels (e.g. $P_i=0$ means that the $i^{th}$ sub-channel is OFF).

The minimum transmission power supervisor algorithm described is meant to perform, in the supervisor unit, the adaptive system optimization. It is a link adaptation algorithm. New characteristics and advantages of the invention covered by this document have been set forth in the foregoing description. It will be understood, however, that this disclosure is, in many respects, only illustrative. Changes may be made in details, particularly in matters of shape, size, and arrangement of parts, without exceeding the scope of the invention. The scope of the invention is, of course, defined in the language in which the appended claims are expressed.

The invention claimed is:

1. A method for supervising an OFDM wireless communication system including a MAC layer and a PHY layer, said PHY layer including a supervisor unit, the method comprising the acts of:

inputting into the supervisor unit a first set of input data comprising a target bit rate (Target_Rate) and a target bit error rate (Target_BER);

processing by the supervisor unit the first set of input data;

outputting from the supervisor unit a code rate C, a set of codes $M=\{M_i\}$ for specifying constellations for sub-channels; and outputting actual QoS data to the MAC layer including outputting an actual rate actually determined for a current transmission and an actual bit error rate (BER) actually determined for the current transmission, said PHY layer including the supervisor unit for controlling performance of the PHY layer, wherein the processing is for minimizing transmission power in the wireless communication system and comprises the acts of:

calculating maximum bit rate achievable by every couple M/C, identified by modulation k and code-rate i, with all sub-channels turned on;

eliminating the couples M/C for which a maximum achievable bit rate is less than requested bit rate;

and for every couple useful M/C:

calculating a minimum number of sub-channels required to achieve the bit rate B;

deriving, from simulation-based curves, a signal to noise ratio (SNR) necessary to obtain a required BER and use it to derive the SNR required by a worst sub-channel;

calculating a total received power for all $N^{(k,i)}$ sub-channels;

selecting and outputting a selected couple M/C ((M, C)$_{min\_pow}$) which minimizes $$P_{r,min\_pow} = \min_{(k,i)}\{P_{r,tot}^{(k,i)}\}.$$

2. The method of claim 1, wherein, in case a starting information is a maximum transmit power and the Target_BER, the processing act further comprises the acts of:

calculating a maximum received power;

calculating a minimum SNR on a weakest sub-channel, for every number j of sub-channels considered and storing the result;

for every couple M/C, calculating a number of sub-channels having an SNR above threshold yielding a BER requested by the MAC layer;

calculating the bit rate achievable using $N^{(k,i)}$ sub-channels;

finding a maximum M/C that yields the maximum bit rate; and selecting and outputting a maximum couple M/C.

3. The method of claim 1, wherein, in case a starting information is a maximum transmit power and the Target_Rate, the processing act further comprises the acts of:

calculating a maximum receive power;

for every M/C, calculating a number of sub-channels used to achieve the bit target rate;

selecting the SNR on the worst sub-channel;

calculated from a BER-SNR curve, the BER corresponding to the worst sub-channel for modulation of k and code-rate i;

finding a minimum couple M/C that yields the minimum value; and selecting and outputting minimum couple M/C.

4. The method of claim 1, further comprising the acts of:

feeding a second set of input data including channel power transfer functions $H=\{|H_i|^2\}$: (index i refers to the $i^{th}$ sub-carrier) from the PHY layer to the supervisor unit;

processing the first and second set of input data for minimizing processing and transmission power in the OFDM wireless communication system; and outputting N, modulation, coding parameters and transmission power parameters to the PHY layer.

5. The method of claim 4, wherein the feeding of the first set of input data comprises feeding a Max_Delay (max tolerable delay).

6. The method of claim 4, wherein the outputting of coding parameters and transmission power parameters to the PHY layer comprises:

N: IFFT/FFT length;
the C: Code rate data;
B: Block length data;
n: data as to the number of decoding iterations;
the M=$\{M_i\}$: data as to a set of codes to specify different constellations adopted for different sub-channels, wherein $M_i=0$ means that the $i^{th}$ sub-channel is OFF;
and P=$\{P_i\}$: data as to a set of different transmission powers adopted for the different sub-channels, wherein $P_i=0$ means that the $i^{th}$ sub-channel is in an OFF state.

7. The method of claim 6, wherein the outputting act further comprises the act of outputting:

a MAC_return comprising a Max_available_Rate (maximum available rate for a current channel condition as far as BER and tolerable delay requirements are concerned); or a Min_available_BER (minimum available BER for the current channel condition as far as rate and tolerable delay requirements are concerned) after the processing act.

8. The method of claim 1, wherein the MAC layer requests a feedback specifying a Feedback_mode, where one bit information is used to specify if MAC is interested to have feedback information on a current maximum available rate or a minimum available BER, and specifying a Service_mode, where one bit data is used to specify if MAC QoS requirements refers to a Rate guaranteed service or to a BER guaranteed service.

9. The method of claim 1, wherein the processing act is for minimizing processing and transmission power in a wireless communication network system and further comprises the act of finding N, the M/C couple and ON sub-channels required to fit the Target_Rate and the Target_BER requirements with a minimum power, given a current channel condition.

10. The method of claim 9, wherein, in case channel conditions prevent achieving a required QoS even with a maximum available transmission power, a supervisor algorithm finds an M/C couple, a number and a position of ON sub-channels required to get a maximum rate compatible with the Target_BER requirement, given the current channel condition and a maximum power allowed by system specifications, or a minimum BER compatible with the Target_Rate, given the current channel condition and the maximum power allowed by the system specifications.

11. An OFDM wireless communication system including a MAC layer and a PHY layer, said PHY layer including the supervisor unit, wherein the supervisor unit is configured to perform the method of claim 1.

12. A supervisor unit in the OFDM wireless communication network system including the MAC layer and the PHY layer including said supervisor unit, wherein the supervisor unit is configured to perform the method of claim 1.

13. An interface unit in the OFDM wireless communication system including the MAC layer and the PHY layer, said PHY layer including a supervisor unit, said interface being located between the supervisor unit and the MAC layer, wherein said interface unit is configured to perform the method of claim 1.

14. A computer-readable medium containing a computer-readable program for use in the OFDM wireless communication system including the MAC layer and the PHY layer, said PHY layer including a supervisor unit, wherein the program, when implemented in the supervisor and run in the supervisor unit, causes the supervisor to perform the method of claim 1.

15. A method for supervising an OFDM wireless communication system including a MAC layer and a PHY layer, said PHY layer including a supervisor unit, the method comprising the acts of:

inputting into the supervisor unit a first set of input data comprising a target bit rate (Target_Rate) and a target bit error rate (Target_BER);

processing by the supervisor unit the first set of input data; and outputting from the supervisor unit a code rate C, a set of codes M={$M_i$} for specifying constellations for sub-channels, an actual rate actually determined for a current transmission and an actual bit error rate (BER) actually determined for the current transmission;

wherein the processing act further comprises the acts of:

comparing Target-Rate and Rate_(N)=C_*log(M_)*N for each available N (from 1 to max_available_N);

selecting and accepting values of N satisfying Target_Rate≦Rate_(N);

ordering the values in ascending order to get [$N_{min}$, $N_{max}$];

assuming $N_{opt}$=$N_{min}$; and providing $N_{opt}$ and minimum TX power parameters as an output.

16. The method of claim 15, further comprising the acts of, after assuming $N_{opt}$=$N_{min}$:

checking if a transmission power constraint is satisfied, if so providing $N_{opt}$ and minimum TX power parameters as output, if not proceeding to check if another value is available in a set [$N_{min}$, $N_{max}$], if so, choosing a next (next_N), setting N to next_N and jumping to select and accept the values of N that satisfy Target_Rate≦rate_(N), if not setting $N_{opt}$=0 and providing $N_{opt}$ and minimum TX power parameters as the output.

17. The method of claim 16, wherein the processing further comprises the acts of:

selecting a best window position among possible ones: (max_available N—($N_{opt}$−1)); and running an adopted TX power minimization algorithm on the selected window.

* * * * *